H. T. BURKEY.
ELECTRIC FISH STOP.
APPLICATION FILED MAY 18, 1918.

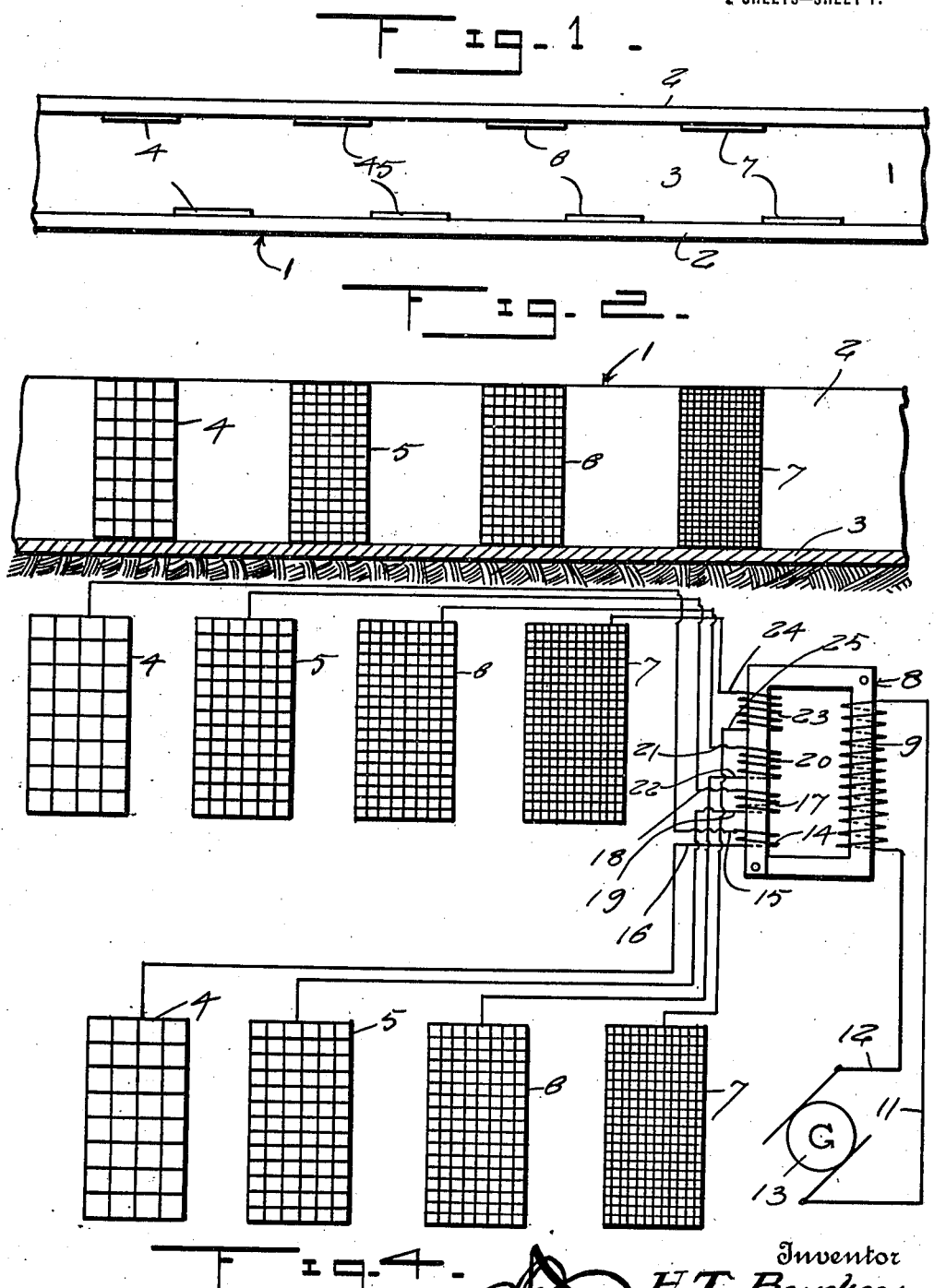

1,292,246.

Patented Jan. 21, 1919.
2 SHEETS—SHEET 2.

Inventor
H. T. Burkey.
By
Attorney

UNITED STATES PATENT OFFICE.

HENRY T. BURKEY, OF TULSA, OKLAHOMA.

ELECTRIC FISH-STOP.

1,292,246.   Specification of Letters Patent.   Patented Jan. 21, 1919.

Application filed May 18, 1918. Serial No. 235,290.

*To all whom it may concern:*

Be it known that I, HENRY T. BURKEY, a citizen of the United States, residing at Tulsa, in the county of Tulsa and State of Oklahoma, have invented certain new and useful Improvements in Electric Fish-Stops; and I do hereby declare the following to be a full, clear, and exact description of the invention, such as will enable others skilled in the art to which it appertains to make and use the same.

This invention relates to improvements in electric fish stops of the character set forth in my application for Letters Patent, filed September 28th, 1917, and serially numbered 193,800 and has for one of its objects the provision of means whereby electrical currents may be caused to travel diagonally through the water of a ditch or trough so as to subject approximately the entire length of the fish to the electrical currents.

Another object of this invention is to provide pairs of diagonally arranged electrodes in the form of screens and the mesh of the screens vary in sizes to progressively increase the quantity or amperage of the electrical currents between the electrodes.

A further object of this invention is the provision of a plurality of partitions to divide the trough or ditch into separate passages or runs and each passage being provided with means for electrifying the water with electric currents of progressively increasing voltage.

A still further object of this invention is the provision of an electric fish stop of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 3:
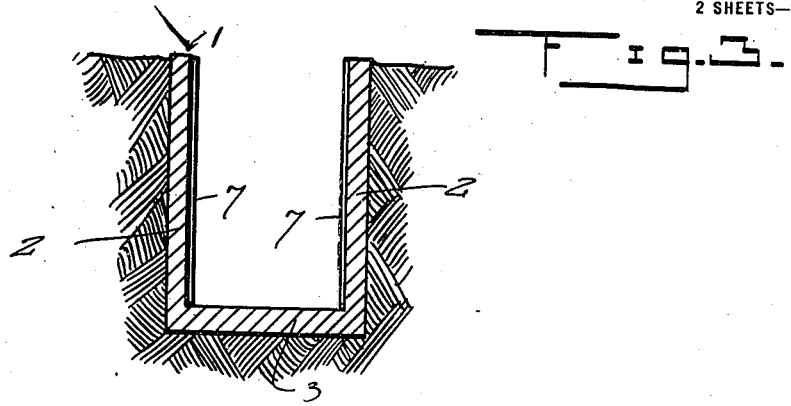
Figure 5:
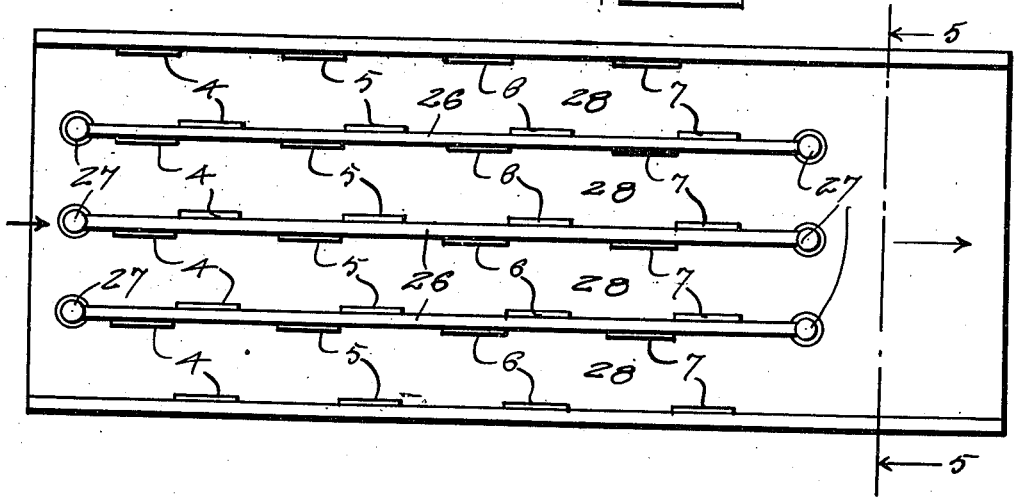
Figure 6:
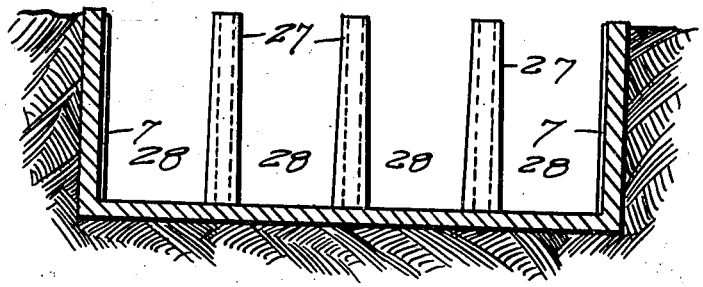

Figure 1 is a plan view of an electric fish stop constructed in accordance with my invention, Fig. 2 is a longitudinal sectional view of the same, Fig. 3 is a transverse sectional view, Fig. 4 is a diagrammatic view, illustrating the electrodes and the manner of electrifying the same, Fig. 5 is a plan view of a modified form of the invention, Fig. 6 is transverse sectional view, taken on the line 5—5 of Fig. 5.

Referring in detail to the drawings, the numeral 1 indicates a trough of a non-conducting material and consists of side walls 2 and a bottom wall 3. The trough is adapted to be located in a ditch, stream or river to form a fish run or sluice. Pairs of diagonally arranged electrodes 4, 5, 6, and 7, are secured vertically to the side walls 2 of the trough, and adapted to extend from the upper edge thereof to the bottom wall 3. The electrodes are in the form of screens as clearly shown in the drawings, and the mesh of each screen of each pair being of the same size. The mesh of the pair of screens of the electrodes 4 is of a comparatively large size so as to offer an increased resistance to the electrical current over the remaining pairs of electrodes. The mesh of the remaining pairs of electrodes consecutively decrease in size in relation to each other so as to decrease the resistance and thereby progressively increase the amperage of the electrical currents between each pair.

A step down transformer 8, consists of a core 9, having approximately thirteen coils to its primary winding which has its ends connected to the lead and return conductors 11 and 12, which are connected to the positive and negative poles of a generator or dynamo 13 which is approximately 110 volts. A secondary winding 14 of two coils of comparatively light or thin wire is carried by the core 9 and has connected thereto conductors 15 and 16 which are connected to the screens or electrodes 4, which furnish the screens or electrodes 4 with a comparatively low amperage of electrical current. The electrodes or screens 4 are located adjacent the mouth of the trough or sluice, so that the electrical current passing between the same will be the first that the fish come in contact with, thereby affecting the fish, causing them to turn back. The current passing between the screens or electrodes 4 is of a comparatively low amperage to prevent injury or killing of small or young fish, but is of sufficient strength to cause them to turn back. A secondary winding 17 of three coils of light or thin wire is carried by the core 9 and has its ends connected to conductors 18 and 19 that are connected to the electrodes or screens 5 which provide an increased quantity of electrical current thereto and they being constructed of smaller mesh than the screens or electrodes 4 render less resistance to the electric currents, thus the currents passing through the water of the trough or sluice between the electrodes or screens 5 is of an increased amperage over that between the electrodes or screens 4 so that the fish not affected by the first electrical currents, will, coming in contact therewith be caused to turn back. A secondary winding 20 of four coils is carried by the core 9 and has connected thereto conductors 21 and 22 which are in turn connected to the electrodes or screens 6 which are of a smaller mesh than the electrodes or screens 4 and 5 so as to increase the amperage of the electrical currents passing between the same over that of the electrical currents passing between the electrodes or screens 4 and 5. A secondary winding 23 of five coils is carried by the core 9 and is connected to the electrodes or screens 7 by conductors 24 and 25. The electrodes or screens 6 are of less ohms resistance so that the amperage of the electrical currents passing between the same is greater than the other electrodes or screens so that fish not affected by the electrical currents from the electrodes or screens will be stopped and caused to turn back.

From the foregoing description taken in connection with the accompanying drawings, it will be noted that means is provided to progressively increase the amperage of the electrical currents passing between the pairs of electrodes or screens, so that fish of various sizes will be stopped without danger of injuring the fish by subjecting them at first to a high amperage of electrical current. It is also to be noted that approximately the entire length of the fish will be subjected to the electrical currents when passing between the pairs of electrodes or screens, thus making the stop more effective than if the electrical currents passed transversely of the trough or sluice.

Referring to my modified form of invention as disclosed in Fig. 5, it consists of a plurality of partitions 26 carried by abutments 27 located in the trough or sluice or may be located directly in a river or stream to form a plurality of passages or runs 28. Each run or passage 28 is provided with pairs of electrodes or screens 4, 5, 6, and 7 upon the partitions 26, and the electrodes or screens of one pair are located in advance of the other so that the electrical currents will pass diagonally through the water from each pair, whereby approximately the entire length of the fish will be subjected to the electrical currents.

While I have shown and described the preferred embodiment of my invention, it will be understood that minor changes in construction, combination, and arrangement of parts may be made without departing from the spirit and scope of the invention, as claimed.

Having thus described my invention, what I claim is:—

1. An electrical fish stop comprising a sluice, electrodes carried by each side of the sluice and diagonally arranged to subject approximately the entire length of the fish to the electrical current passing through the water from the electrodes, and means electrifying the electrodes.

2. An electrical fish stop comprising a sluice, pairs of electrodes carried by each side of the sluice and diagonally arranged in relation to each other to subject approximately the entire length of the fish to the electrical currents passing through the water from the pairs of electrodes, and means electrifying the electrodes.

3. An electrical fish stop comprising a sluice, pairs of diagonally arranged electrodes carried by each side of the sluice and constructed of mesh of different sizes to progressively decrease the ohms resistance thereof of each pair, and means increasing the voltage of each pair of electrodes.

4. An electrical fish stop comprising a sluice, pairs of diagonally arranged electrodes carried by each side of the sluice and constructed of mesh, the mesh of the pairs of electrodes increasing in size to decrease the ohms resistance consecutively of the pairs of electrodes, means electrifying the electrodes, and means progressively increasing the amperage of the electrical currents to the pairs of electrodes.

5. An electrical fish stop comprising a sluice, pairs of diagonally arranged electrodes carried by each side of the sluice, a transformer including a core, a primary winding carried by the core and connected to an electrical source, and a plurality of secondary windings carried by the core and connected to the pairs of electrodes to progressively increase the amperage to the electrodes and to reduce the voltage from the electrical source.

6. In a fish stop, a run, electrodes arranged adjacent both sides of said run, and means for electrically charging said electrodes.

In testimony whereof I affix my signature in presence of two witnesses.

HENRY T. BURKEY.

Witnesses:
  W. M. FLEETWOOD,
  W. E. PATTERSON.